TOUSSAINT TRUDEAU.

Improvement in Globes for Gas Lights.

No. 4,633. Reissued Nov. 7, 1871.

WITNESSES

H. LaPierre

Toussaint G. Coursolles

INVENTOR

Toussaint Trudeau

THE NORRIS PETERS CO., PHOTO-LITHO., WASHINGTON, D. C.

UNITED STATES PATENT OFFICE.

TOUSSAINT TRUDEAU, OF OTTAWA, CANADA.

IMPROVEMENT IN GLOBES FOR GAS-LIGHTS.

Specification forming part of Letters Patent No. 117,486, dated July 25, 1871; reissue No. 4,633, dated November 7, 1871.

*To all whom it may concern:*

Be it known that I, TOUSSAINT TRUDEAU, of Ottawa, in the county of Carleton and Dominion of Canada, have invented certain Improvements in Draught-Tubes or Globes for Gas-Burners, of which the following is a specification, reference being had to the accompanying drawing.

The object of my invention is to obtain a tranquil gas-flame with illuminating gas consumed through vertical flat-flame burners by means of a tube or globe having a wide unobstructed opening through it, with diameters at top and bottom of certain adjusted proportions, the tube or globe being of such limited height that I can avail myself of the elegant forms of the globes at present in use, the said globes being applied to the burners in the relative positions hereinafter specified.

Figure 1:
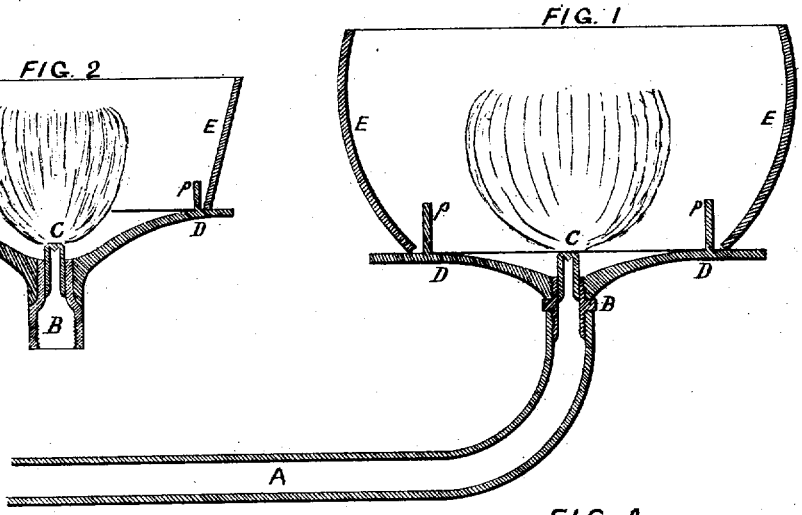
Figure 2:
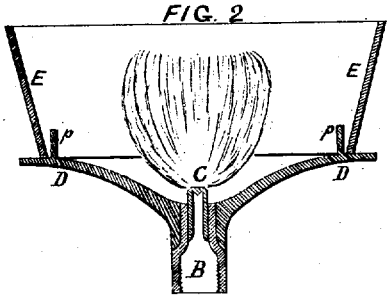
Figure 3:
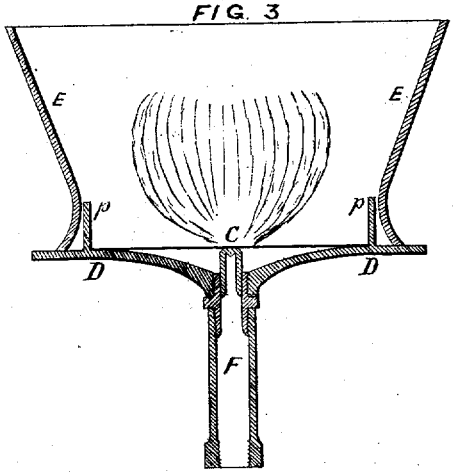
Figure 4:
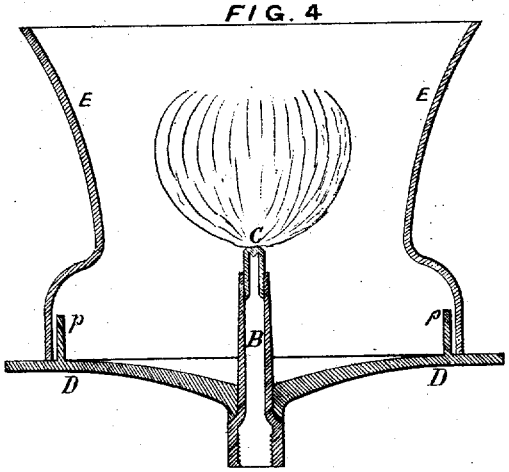

Figure 1 is a vertical section of one of my tubes or globes fitted to gas-fixtures of the best form. Fig. 2 is a vertical section of a low globe or tube fixed above the level of the top of the burner on a short burner-holder, such as may be used when applied to gas-fixtures of ordinary good make and workmanship. Fig. 3 is a vertical section of a globe or tube fitted to a longer burner-holder, to be used when the gas-fixtures are of a defective make. Fig. 4 is a vertical section of a globe continued below the level of the top of the burner. Figs. 5 to 21 are vertical sections of globes or tubes, showing some of the various forms and outlines which may be given them.

A is the pipe conveying gas to the burner. B is the burner-holder. C is a flat-flame burner, such as a fish-tail or a bat-wing. D D is a gallery or supporter, made with three or four arms and upright pins, *p p*. E E is the draught-tube or globe, resting on the gallery D D, and retained in position by the pins *p p*. F is a long burner-holder.

To obtain a tranquil gas-flame, as above stated, I use any good vertical flat-flame burners, fitted to any well-made gas-fixtures having wide and free passages and allowing the gas to flow smoothly to the burner. Over the burner I apply a tube or globe having a wide and unobstructed opening throughout, with diameters at top and bottom of certain adjusted proportions, as hereinafter specified. The flame emitted from a naked gas-jet, unassisted by a draught apparatus, burns with a flickering up-and-down movement very fatiguing to the eyes, and but little improvement is observed when a globe or bell-glass, of the forms made hitherto for use over vertical, flat-flame burners, is placed on the light, the flame then oscillating from side to side. This defect is attributable to the fact that these globes, as at present constructed, have lower openings, which are too narrow in proportion to their height, or have an otherwise obstructed air-duct.

The result of using my improved form of tubes or globes is that the flame is enveloped in a smooth and gently-ascending current of air, which causes the light to burn steadily without flicker or oscillation.

The additional advantages arising from the use of my apparatus are: First, that in an ordinary quiet in-door atmosphere a tranquil light is obtained at a very low and consequently economical pressure of gas. Second, that the action of the air is so controlled that the combustion of the noxious part of the gas-flame is more complete. Third, that the wide unobstructed lower opening allows the free passage of light in the direction most required—that is to say, downward—and affords facility for lighting without soiling the globe. Fourth, that the limited height, combined with the wide upper opening, removes, I may say, entirely the risk of breakage through the overheating and unequal expansion of the globe or tube when made of glass.

I have found by experiment that in order to secure the desired steady flame the globes used must have an upper and lower opening and a height of certain adjusted relative proportions, and these relative proportions are stated in the following table, to wit:

| Diameter of lower opening. | Height. | Diameter of upper opening. |
|---|---|---|
| 2½ inches. | 2½ to 4 inches. | 4 to 6 ches. |
| 3 " | 2½ to 5 " | 4 to 6 " |
| 3½ " | 2½ to 5 " | 4 to 6½ " |
| 4 " | 2½ to 5½ " | 4 to 7 " |
| 4½ " | 2½ to 5½ " | 4½ to 7½ " |
| 5 " | 2½ to 6 " | 5 to 8 " |
| 5½ " | 2½ to 6 " | 5½ to 8½ " |
| 6 " | 2½ to 6½ " | 6 to 9 " |
| 6½ " | 3 to 6½ " | 6½ to 9½ " |
| 7 " | 3 to 7 " | 7 to 10 " |

It is obvious that all intermediate sizes between two and a half and seven inches, the diameters of whose lower openings may be expressed in fractional parts of an inch, should have their heights and upper openings of corresponding proportions, since the utility or adaptation of the globe to secure the desired result depends upon the proper relations between its openings and its height.

For general use I give to my draught-tubes or globes the following dimensions: Diameter of lower opening, four and one-half inches; diameter of upper opening, six and one-half inches; height, three and one-half inches; and I curve the sides somewhat, as shown in Fig. 1 of the accompanying drawing.

Figs. 5 to 21 are examples of outlines which may be chosen. Most of these, again, may be made so as to present other shapes by changing the proportions of height to breadth.

The best and most economical use of the gas is obtained when the draught is at the lowest point consistent with steadiness of light—that is to say, when the flame is on the verge of flickering and yet does not. This limited draught is sufficiently obtained for practical purposes by the use of globes or tubes of about three and one-half inches in height, or by taller globes or tubes with narrow upper openings within the limits herein specified.

I obtain the best results by placing the lower edge of my draught-tubes or globes opposite the lower part of the flame, either at or near the level of the top of the burner. The effect of very low globes or tubes is improved by their being raised above the level of the top of the burner, as shown by Fig. 2.

Figures 5, 6, 7, 8, 9, 10, 11:
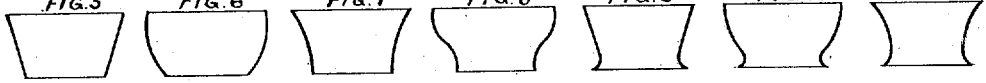
Figures 12, 13, 14, 15, 16, 17, 18:
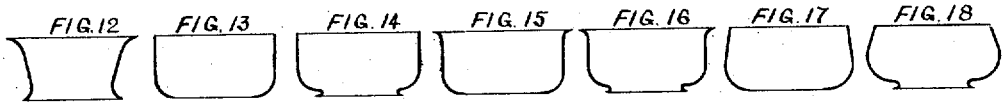
Figures 19, 20, 21:
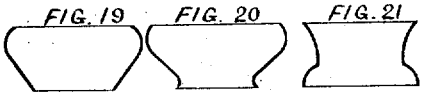

When measuring the diameter of any of my globes, the lower portion of which diverges slightly in a downward direction, as shown in Figs. 9, 10, and 12, I ignore the divergence and take the narrow part of the tube or globe at the point where such divergence commences as the diameter of the lower opening. With tubes diverging upward in the form of a trumpet, as in Figs. 12, 15, and 16, the dimensions of the upper openings should not be measured on the extreme diameter, but more as if the general direction of the sides was produced to the full length of the tube.

In cases of globes or tubes extending below the level of the top of the burner, as shown by Fig. 4, I adopt the narrowest diameter of the globe or tube nearest the top level of the burner as the diameter of the lower opening.

I have found by experiment that the force of draught is slightly increased when my globes or tubes are continued downward to any depth within three inches below the level of the top of the burner, and that it is more certain that the steadiness of the flame will not be interfered with by this extension if said extension be made wider than the diameter of the globe or tube at the level of the top of the burner, as shown, for example, by Fig. 4. Any design for a draught-tube or globe, or any form of curve at the top or bottom whereby the flame would be liable to approach within one inch of the tube or globe, should be rejected.

My draught-tubes or globes may be manufactured of glass, (clear, ground, or colored,) porcelain, paper, pasteboard, thin sheet metal, or other suitable material, and ornamented according to fancy.

When made of paper or pasteboard the globes or tubes should not be higher than about four inches, and should have wide openings of not less than four to five inches diameter at the bottom and seven to eight inches at the top. I prefer the circular form for them, as seen from the top; but they may be made of oval or polygonal form, if so desired.

The burner should be in the center of the opening of the globe or tube, although it may be placed out of center without inconvenience when the globes or tubes are made of glass or other incombustible material.

It should be stated that the vibration of gas-light is not only due to defective combustion, but is often traceable to badly-formed elbows or an otherwise obstructed passage through the pipe, which prevents the unimpeded flow of the gas to the burner. For this reason I prefer applying my draught-tubes or globes to gas-fixtures composed of wide pipes, properly-constructed elbows, and good burners, such as shown by Fig. 1; but when it is required to apply my tubes or globes to gas-fittings not possessing the above advantages, but, on the contrary, offering a too contracted passage for the gas in close proximity to the flame, or having badly-formed elbows, I use a longer burner-holder, as shown by F in Fig. 3. The long burner-holder F has the effect of quieting the gas, forming as it does a reservoir, in which the gas, after its passage through the contracted pipes or sharp elbows, may become to some extent tranquilized.

In case of globes or tubes having lower openings of less than four inches in diameter the lower edge may be turned outwardly, as in ordinary globes, and as shown in Figs. 14 and 16, and said tubes or globes may be supported by galleries fitted with binding-screws, as in galleries now in general use.

I do not claim as my invention the gas-pipe A; nor the burner-holders B or F; nor the burner C; nor the gallery D D; but Having described my invention, what I do claim is—

A shade or globe for gas-burners, having its bottom and top openings and its height of certain adjusted relative proportions, as herein set forth, and so arranged as to bring the narrowest part of its lower opening on or nearly on a level with the tip of the burner for regulating the in-flowing currents of air and preventing the flickering of the flame, substantially as described.

TOUSSAINT TRUDEAU.

Witnesses:
H. LA PIERRE,
TOUSSAINT G. COURSOLLES. (90)